No. 865,371. PATENTED SEPT. 10, 1907.
O. M. FISHER.
DRAFT EQUALIZER.
APPLICATION FILED APR. 12, 1906.

Witnesses  
Inventor  
O. M. Fisher.  
By O'Meara & Buck  
Attorneys

UNITED STATES PATENT OFFICE.

OLIVER M. FISHER, OF WASHBURN, ILLINOIS.

DRAFT-EQUALIZER.

No. 865,371.  Specification of Letters Patent.  Patented Sept. 10, 1907.

Application filed April 12, 1906. Serial No. 311,323.

*To all whom it may concern:*

Be it known that I, OLIVER M. FISHER, a citizen of the United States, residing at Washburn, in the county of Woodford and State of Illinois, have invented a new and useful Improvement in Draft-Eveners, of which the following is a specification.

This invention relates to draft eveners and more particularly to those adapted to be used on plows and agricultural machines; the object being to provide an equalizer that is very simple and cheap in construction and one which is very effective in use.

Another object of my invention is to provide an equalizer so constructed that any number of horses can be attached so as to prevent side draft.

With these various objects in view, the invention consists in the employment of a doubletree provided with a link carrying a doubletree at one end and a pulley at the other end, said pulley carrying a chain having a doubletree connected to one end and a rod connected to the other carrying a doubletree.

The invention consists also in certain details of construction, hereinafter fully described and pointed out in the claims.

Figure 1:
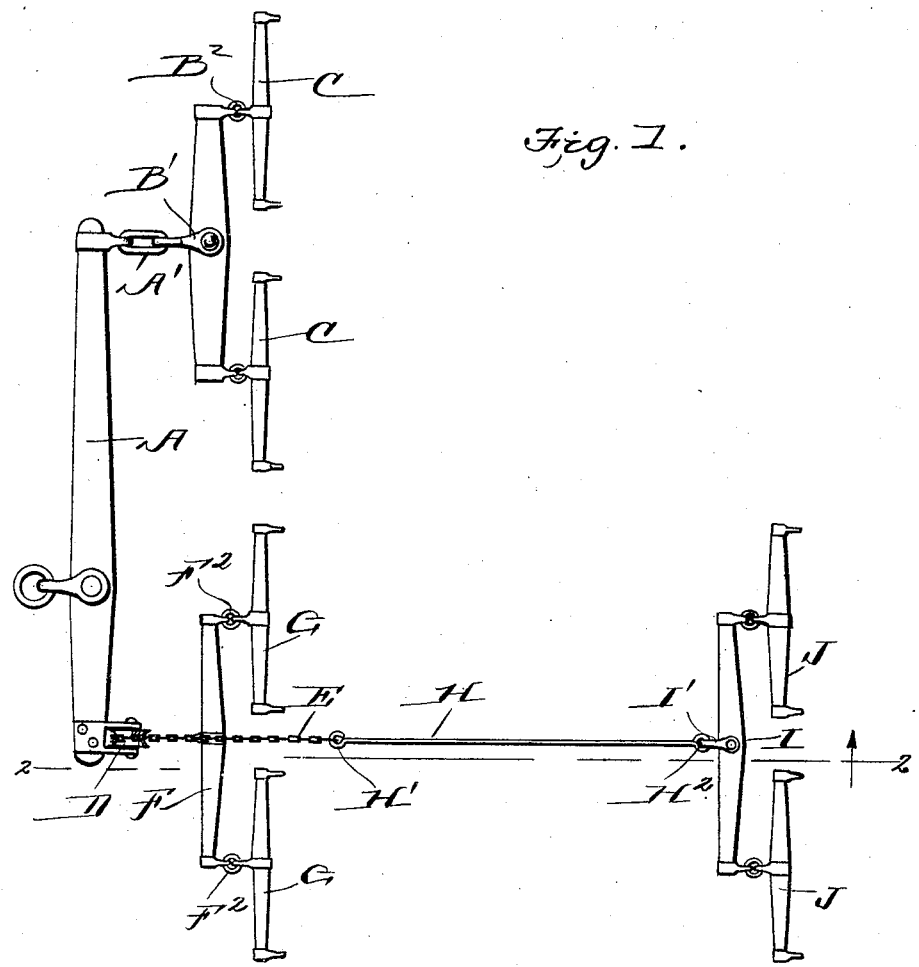
Figure 2:
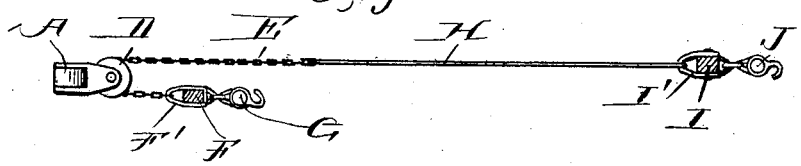

In the drawings forming a part of this specification:—Figure 1 is a top plan view of my improved draft equalizer. Fig. 2 is a section taken on the line 2—2 of Fig. 1.

Referring to the drawings A indicates a doubletree, having an ordinary clevis connected to one side of the center by means of which it is adapted to be connected to the plow or machine. One end of the doubletree A, is provided with a link A′, connected to a clevis B′, of the doubletree B, which is provided with links B², at its end carrying swingle trees C. The other end of the doubletree A, is provided with a pulley D, over which a chain E, is adapted to work. A clevis F′, carried by the doubletree F, is connected to one end of the chain E, provided with links F², carrying swingle-trees G. The other end of the chain E, is connected to an eye H′, of a rod H, the other end of which is provided with an eye H², connected to a clevis I′, of the doubletree I, which is provided with links at its ends carrying swingletrees J.

From the foregoing description it will be readily seen that by substituting a swingletree for a doubletree, the number of horses can be decreased and that by adding swingletrees to the doubletrees, the number of horses can be increased without effecting the equalization of the draft among the horses.

Having thus fully described my invention, what I claim as new and desire to secure by Letters Patent is:—

In a draft equalizer, the combination with a double tree having a clevis at one side of its center, of a double tree connected to the end of the greater length by means of a link and clevis, a pulley connected to the shorter end, a chain passing over said pulley, a double tree connected to one end of said chain, a rod provided with hooked ends connected to the other end of said chain and a double tree connected to said rod, substantially as described.

OLIVER M. FISHER.

Witnesses:
  HENRY LESCH,
  HARRY TWEDDALE.